United States Patent
Yen et al.

(10) Patent No.: US 8,564,272 B2
(45) Date of Patent: Oct. 22, 2013

(54) INTEGRATED SOFT START CIRCUITS

(75) Inventors: Ding Hsu Yen, Taipei (TW); Wei Zhang, Sunnyvale, CA (US); Henry H. Yuan, Fremont, CA (US)

(73) Assignee: Integrated Memory Logic, Inc., Campbell, CA (US)

(*) Notice: Subject to any disclaimer, the term of this patent is extended or adjusted under 35 U.S.C. 154(b) by 267 days.

(21) Appl. No.: 12/006,598

(22) Filed: Jan. 4, 2008

(65) Prior Publication Data

US 2009/0174385 A1 Jul. 9, 2009

(51) Int. Cl.
G05F 1/575 (2006.01)

(52) U.S. Cl.
USPC .................. 323/288; 323/282; 323/901

(58) Field of Classification Search
USPC ............. 323/282, 284, 288, 908, 901
See application file for complete search history.

(56) References Cited

U.S. PATENT DOCUMENTS

| | | | | |
|---|---|---|---|---|
| 3,793,540 A * | 2/1974 | DeVale | .................. | 327/132 |
| 5,780,904 A * | 7/1998 | Konishi et al. | ................ | 257/369 |
| 7,208,927 B1 * | 4/2007 | Nguyen | ................ | 323/282 |
| 7,595,625 B2 * | 9/2009 | Sirito-Olivier et al. | ....... | 323/315 |
| 7,719,243 B1 * | 5/2010 | Balogh | .................. | 323/281 |
| 2005/0024033 A1 * | 2/2005 | Nakata | .................. | 323/282 |
| 2005/0141162 A1 * | 6/2005 | Sanzo | .................. | 361/93.9 |
| 2006/0006854 A1 * | 1/2006 | Oswald et al. | ............... | 323/282 |
| 2007/0052403 A1 * | 3/2007 | Stoichita | .................. | 323/316 |
| 2007/0127276 A1 * | 6/2007 | Yoshimatsu et al. | ........... | 363/49 |
| 2007/0296386 A1 * | 12/2007 | Umeki | .................. | 323/284 |
| 2008/0024099 A1 * | 1/2008 | Oki et al. | .................. | 323/282 |
| 2008/0252281 A1 * | 10/2008 | Yan et al. | .................. | 323/288 |
| 2009/0278521 A1 * | 11/2009 | Omi et al. | .................. | 323/288 |
| 2010/0066344 A1 * | 3/2010 | Li | .................. | 323/371 |

FOREIGN PATENT DOCUMENTS

WO    WO 2007080777 A1 *    7/2007

* cited by examiner

*Primary Examiner* — Adolf Berhane
*Assistant Examiner* — Fred E Finch, III
(74) *Attorney, Agent, or Firm* — Sidley Austin LLP

(57) ABSTRACT

Various circuits, including DC/DC converters can include an integrated soft-start circuit. The integrated soft-start circuit includes a PMOS transistor configured to receive a reference signal and control the current to a bipolar junction transistor when the reference signal is in a first state. First and second NMOS transistors are included in the soft-start circuit, and receive the reference signal to turn off (to release from reset) when the reference signal is in the first state. A capacitor coupled in parallel with one of the NMOS transistors controls the soft-start signal. Various different transistors types can be used depending on the desired implementation.

17 Claims, 4 Drawing Sheets

INTEGRATED SOFT START CIRCUITS

TECHNICAL FIELD OF THE INVENTION

This invention relates to inrush current control for power converters and power amplifiers, and more particularly, to integrated soft start circuits for such devices.

BACKGROUND

Inrush current is generally a momentary input current surge in an electrical device occurring when the power control device is first activated. The term is also sometimes used to refer to the maximum, instantaneous input current drawn by an electrical device when first turned on. Although inrush current typically reduces to a lower steady-state device current (e.g., during normal device operation), the effects of inrush current can be significant. Inrush currents can damage device components, lower supply voltage available to other circuits, decrease power efficiency, cause system errors, make devices difficult to control, and complicate device design. For example, if the input power source for a device is current limited or has poor load regulation, large inrush currents can cause the input voltage to drop significantly, thereby affecting overall device operation. While many devices are subject to problematic inrush currents, DC/DC converters and power amplifiers are particularly susceptible because of input capacitor and/or filter element charging that occurs when power is first provided to such devices.

Soft-start circuits can be used to alleviate the problems associated with inrush currents. This is typically accomplished by ramping up the output of the power control device (e.g., a DC/DC converter) at a rate slower than would otherwise occur without the soft-start circuit. Numerous different types of soft-start circuits have been implemented including, for example: soft-start circuits that delay full current output of a power converter by linearly increasing a pulse width modulator (PWM) pulse width; soft start circuits that ramp a reference voltage provided to an error amplifier from zero to its nominal value, thereby easing the output voltage up at a slower rate; and soft-start circuits that limit the device loop until the soft start voltage is higher than the desired voltage reference (usually from bandgap reference) to the error amplifier, while the desired output is reached.

When applied to existing integrated circuit devices such as DC/DC converter ICs, traditional soft-start circuits utilize one or more off-chip components such as capacitors, and typically require the use of one or more additional IC package pins for controlling the inrush current. Accordingly, it is desirable to have integrated circuit devices that include soft-start circuitry, thereby reducing system cost, simplifying system design and reducing the number of needed components. Moreover, it is further desirable to improve the quality of soft-start circuit operation.

SUMMARY

Various circuits, including DC/DC converters can include an integrated soft-start circuit. The integrated soft-start circuit includes a PMOS transistor configured to receive a reference signal and control the current to a bipolar junction transistor when the reference signal is in a first state. First and second NMOS transistors are included in the soft-start circuit, and receive the reference signal to turn off (to release from reset) when the reference signal is in the first state. A capacitor coupled in parallel with one of the NMOS transistors control the soft-start signal. Various different transistors types can be used depending on the desired implementation.

Accordingly, one aspect of the present invention provides a circuit. The circuit includes a controlled circuit, an error amplifier coupled to the controlled circuit, and a soft-start circuit coupled to the error amplifier. The error amplifier is configured to provide an error amplifier signal to the controlled circuit. The error amplifier includes a first positive input terminal, a second positive input terminal coupled to the first positive input terminal, and a negative input terminal. The soft-start circuit is configured to provide a soft-start signal to at least one of the first positive input terminal and the second positive input terminal. A difference between the soft-start signal and a feedback signal controls a switching duty cycle to limit inrush current of inductance and an overshoot voltage of the controlled circuit.

Another aspect of the present invention provides a method. A reference voltage signal is generated. A soft-start circuit is activated to produce a soft-start voltage according to characteristics of a bipolar transistor and a capacitor. A feedback voltage associated with a voltage divider is sensed. The reference voltage, the soft-start voltage, and feedback voltage are provided to a differential error amplifier. One or more of an amplifier circuit or a voltage regulator circuit are controlled according to an output of the differential error amplifier.

The foregoing is a summary and thus contains, by necessity, simplifications, generalizations and omissions of detail; consequently, those skilled in the art will appreciate that the summary is illustrative only and is not intended to be in any way limiting. As will also be apparent to one skilled in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

Figure 1:
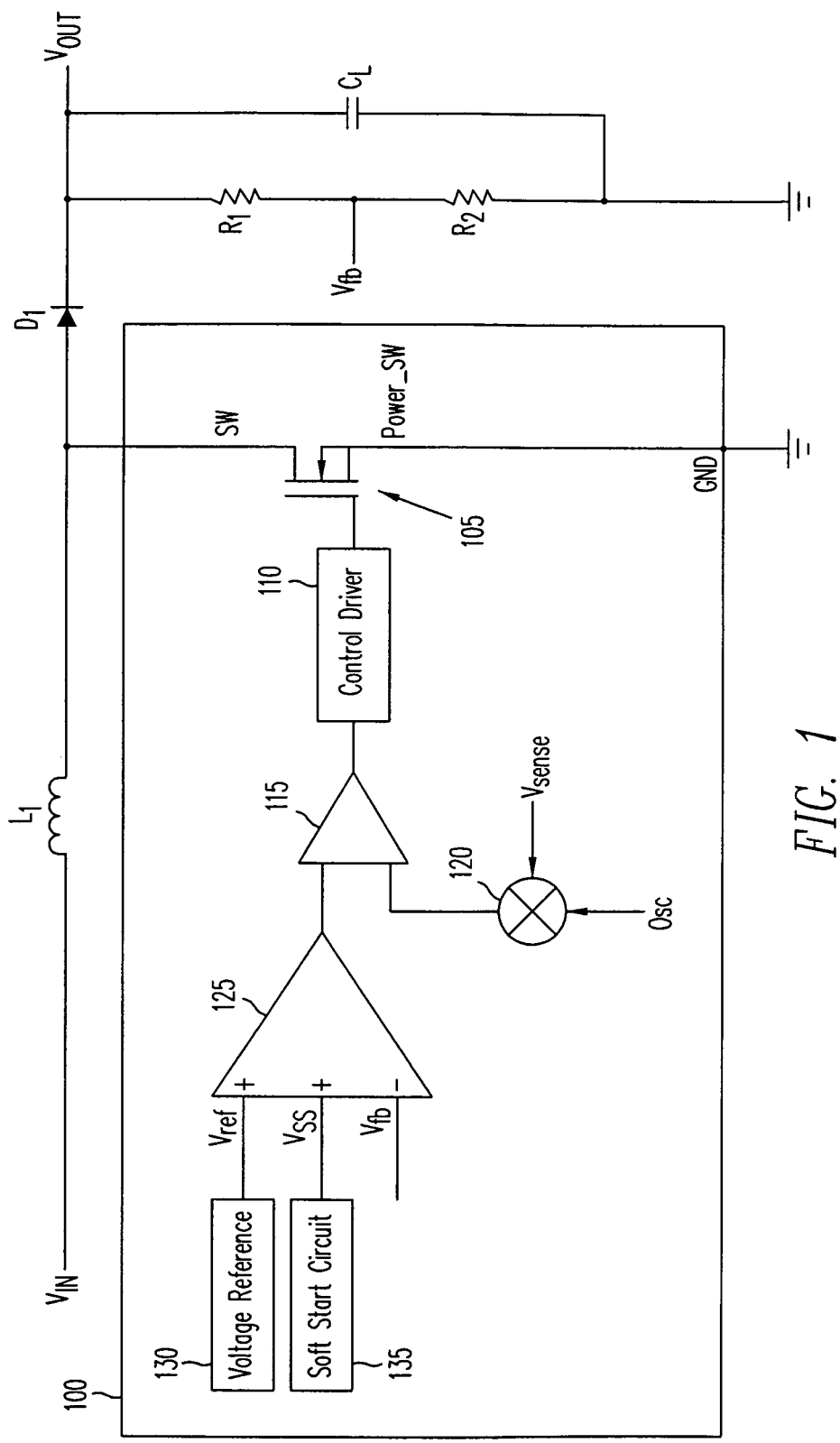
FIG. 1 is a schematic diagram of a DC/DC converter including an integrated analog soft-start circuit.

The embodiments of the present invention and their advantages are best understood by referring to FIGS. 1 through 5 of the drawings. Like numerals are used for like and corresponding parts of the various drawings.

Although many of the examples described in the present application will emphasize application of soft-start circuits to DC/DC voltage converters, it will be understood by those skilled in the art that these circuits can be used with a variety of devices where inrush current protection is desired including, for example, power amplifiers and other types of voltage regulators. Moreover, in the context of application to DC/DC voltage converters, soft-start circuits (and related circuits) of the present application can be used in conjunction with a variety of different types of DC/DC voltage converters including buck converters (used to the reduce a DC voltage to a lower DC voltage), boost converters (providing an output voltage that is higher than the input voltage), inverter regulators (e.g., buck-boost regulators generating an output voltage having polarity opposite of the input voltage), flyback regulators, push-pull regulators, and the like. In general, the circuits and techniques of the present application can be applied to a wide variety of circuits, and the various circuits described in the present application can be used to control various controlled circuits such as relevant portions of regulators, amplifiers, and the like.

Additionally, the present application describes various circuits designed to be integrated with other circuits. Thus, for example, the soft-start and error amplifier circuits described below are designed to be integrated with the circuits they are used to control or operate, e.g., controlled circuits such as voltage regulators, power amplifiers, portions thereof, and the like.

The circuits of the present application can therefore be implemented using any of a variety of integrated circuit fabrication processes that are suitable for the underlying device. Examples of such integrated circuit fabrication processes include, but are not limited to, BCD (bipolar, CMOS, DMOS) processes, digital CMOS processes, analog CMOS processes, and mixed-signal CMOS processes. BCD processes incorporate, into a single foundry process flow, what are typically three different process types: bipolar, which is used for analog control devices, CMOS (Complementary Metal Oxide Semiconductor) which forms devices that operate quickly and are suitable for digital control circuits, and DMOS (Double Diffused MOS) which is used to form devices that are appropriate for high current output. Similarly, the related BiCMOS foundry process integrates manufacturing technology for forming bipolar devices and CMOS devices on a single die, and can also be used. Numerous other commercial and specialized processes exist that can be used to fabricate one or more of the die. Examples include CMOS variations such as high voltage CMOS, RF CMOS, SiGe—BiCMOS, radiation hardened processes, GaAs specific processes, and the like.

FIG. 1 is a schematic diagram of a DC/DC converter 100 including an integrated soft-start circuit. In the examples illustrated, converter 100 is a DC/DC boost converter, including current mode boost control, a power FET, a bandgap reference voltage, and soft-start circuitry. DC/DC converter 100 includes a single NMOS power FET 105 integrated into the device. In some embodiments, converters similar to converter 100 will include multiple power FETs, while in still other embodiments, circuit 100 is designed to integrate the control circuitry needed for converter operation into a single IC, while accommodating power FETs that are external that device.

NMOS power FET 105 is driven by control driver 110 which operates as a gate driver for the gate of FET 105. In particular, control driver 110 uses well known pulse-width modulation (PWM) techniques to drive FET 105 and thereby control the output $V_{OUT}$ of the device. The output voltage $V_{OUT}$ is monitored at the node between resistors $R_1$ and $R_2$ to produce feedback signal $V_{fb}$. The feedback voltage monitored through the resistive voltage divider formed by resistors $R_1$ and $R_2$ is compared to a reference voltage $V_{ref}$ produced by voltage reference circuit 130. Differential transconductance error amplifier 125 produces an error signal that is fed to PWM comparator 115. At the beginning of a switching cycle, NMOS power FET 105 is turned on and the current associated with inductor $L_1$ ramps up. FET 105 current is typically measured and/or converted to voltage $V_{sense}$ using appropriate sensing circuitry (e.g., a current-sense amplifier) not shown. $V_{sense}$ is combined (120) with the ramp signal from an oscillator (not shown) and provided to comparator 115. When the sum of the oscillator ramp and the current-sense voltage $V_{sense}$ is greater than the error signal from error amplifier 125, comparator 115 and control driver 110 operate to turn FET 105 off, causing the inductor current to ramp down until the internal clock initiates the next switching cycle.

The duty-cycle of pulse-width modulation is thereby adjusted to provide the necessary load current at the desired output voltage. When turned on, n-channel MOSFET 105 allows energy to be stored in the magnetic field of inductor $L_1$. When FET 105 is turned off, this energy is delivered to the load to boost the output voltage. More specifically, whenever switch 105 is on, input voltage $V_{IN}$ is forced across the inductor causing the current through it to increase. When switch 105 is off, the decreasing inductor current forces the switch end of inductor $L_1$ to swing positive. This forward biases diode $D_1$, allowing capacitor $C_L$ to charge up to a voltage that is higher than the input voltage. During steady-state operation, the inductor current flows into both the capacitor $C_L$ and the load (not shown) during periods when switch 105 is off. When the switch is on, the load current is supplied only by capacitor $C_L$.

As will be known to those skilled in the art, the choice of power MOSFET(s) directly affects converter performance. Moreover, by selecting appropriate resistor, capacitor, and inductor values, regulator response can be optimized for a wide range of input voltages, output voltages, and load currents.

Integrated circuits such as those illustrated in FIG. 1 typically make extensive use of voltage and current references. Such references are DC quantities that exhibit little dependence on power supply and fabrication process parameters, while also demonstrating a well-defined (or preferably no) dependence on temperature. While many different voltage reference circuits can be used to implement voltage reference 130, perhaps the most commonly implemented reference circuit is the bandgap reference circuit. Numerous different bandgap reference circuit implementations exist, but all share the common feature that the negative temperature coefficient of the diode/transistor PN junction is balanced with a voltage exhibiting a positive temperature coefficient.

As is known, bandgap reference voltage circuits provide a substantially constant output reference voltage over a temperature range. To accomplish this, bandgap references provide temperature compensation so that the output reference voltage does not vary with temperature. Generally, the output reference voltage is a function of the base-to-emitter voltage ($V_{be}$) of one bipolar transistor and the difference between the base-to-emitter voltages ($\Delta V_{be}$) of a pair of bipolar transistors having different associated current densities. The value of the temperature independent reference voltage is generally adjusted by scaling $\Delta V_{be}$. This arrangement provides the desired temperature compensation since $V_{be}$ of a bipolar transistor has a negative temperature coefficient while $\Delta V_{be}$ of a pair of bipolar transistors has a positive temperature coefficient. Thus, the temperature variations of the $V_{be}$ and the $\Delta V_{be}$ terms establishing the reference voltage can be made to cancel, thereby providing an output reference voltage that is essentially constant with respect to temperature.

Similarly, comparator 115 can be implemented using a variety of different circuits. For example, many analog circuits utilize a comparator to compare two input voltages and produce an output voltage representing the sign of the net difference between the input voltages, e.g., a signal that is either high or low depending upon the relationship of the two input voltages. Comparators are typically implemented using operational amplifiers having positive feedback, which, for example, takes a fraction of the amplifier's output signal back to the non-inverting input. Those skilled in the art will recognize that numerous different comparator circuits can be employed.

As shown in FIG. 1, there are three stages in the generation of the $V_{OUT}$ of the DC/DC boost converter. During power up, the DC/DC converter goes through a soft-start cycle. Right after $V_{OUT}$ reaches its desired voltage, some voltage overshoot occurs before it stabilizes. The magnitude of the $V_{OUT}$ overshoot is generally dependent on the architecture of the soft-start circuit. After the overshoot period, $V_{OUT}$ eventually settles down to the regulated voltage level. The primary purpose of soft-start circuit 135 is to minimize the $V_{OUT}$ overshoot during the power-on period. If the magnitude of the $V_{OUT}$ overshoot is too large, the system can become unstable, malfunction, or damage can be caused to system components.

Two parallel input signals, $V_{ref}$ and $V_{SS}$ are coupled to the positive input of error amplifier 115. As will be described in greater detail below, error amplifier 115 is typically implemented as a differential input error amplifier. Error amplifier 115 is part of the closed-loop control used to force the devices output to match a desired value. Various different analog circuits can be used to implement error amplifiers as will be known to those skilled in the art. In the example illustrated, a differential input operational amplifier provides the error signal.

The signal $V_{ref}$ is a reference voltage generated by voltage reference circuit 130. Soft-start signal $V_{SS}$ is generated by the soft-start circuit 135, an example of which is described in greater detail below with respect to FIG. 2. The inverting input of error amplifier 125 is coupled to a feedback node so as to receive feedback signal $V_{fb}$, as is common in pulse-width modulated regulator circuits. During the soft-start cycle, soft-start signal $V_{SS}$ forces feedback signal $V_{fb}$ to follow it through the control of error amplifier 125. In so doing, the ramping of $V_{OUT}$ is smoothly controlled to minimize inrush current and achieve soft-start operation at device power-up. After soft-start signal $V_{SS}$ becomes higher than $V_{ref}$, the soft-start cycle is completed. $V_{SS}$ no longer dominates the control of the $V_{OUT}$. Instead, the control signals $V_{ref}$ and $V_{fb}$ provide the system negative feedback control through conventional operation of error amplifier 125, thereby regulating $V_{OUT}$ to the target value.

Figure 2:
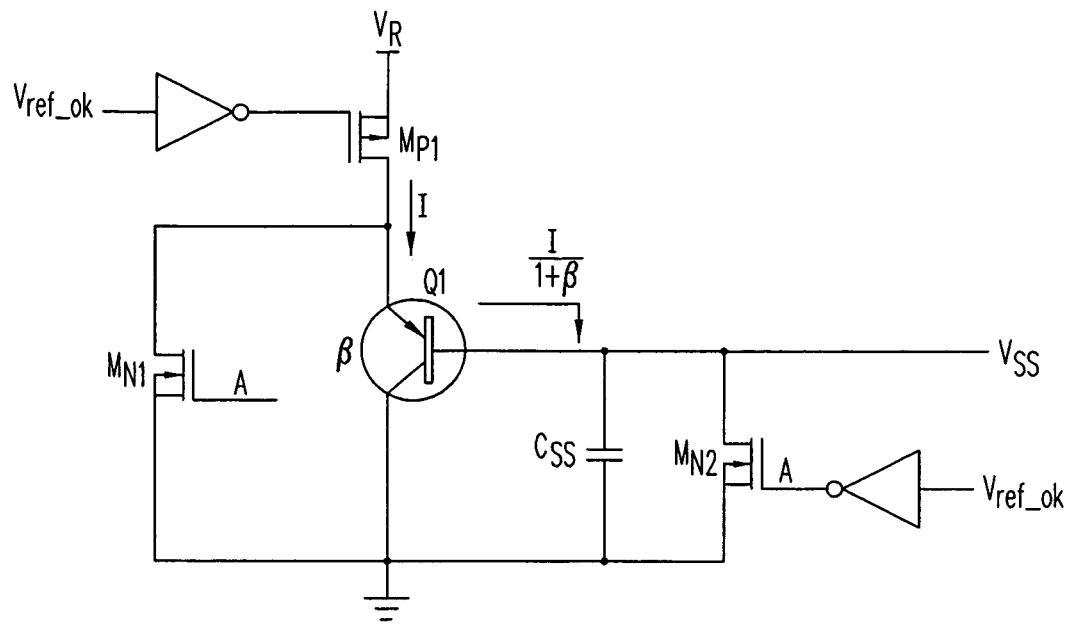
FIG. 2 is a schematic diagram illustrating an example of a soft-start circuit for use in the device of FIG. 1.

FIG. 2 is a schematic diagram illustrating an example of a soft-start circuit for use in the device of FIG. 1. Because it typically takes some finite time period for a voltage reference circuit such as circuit 130 to reach steady state operation after initially being activated, such circuits often provide a signal indicating when the reference voltage is suitable for use by other circuits. In the example of FIG. 2, such a signal is illustrated by $V_{ref\_ok}$. For example, this signal can be asserted by a bandgap reference circuit when it reaches its designated steady state reference voltage, e.g., 1.25 V. When signal $V_{ref\_ok}$ goes high, the soft-start circuit of FIG. 2 can be activated.

Inverting of $V_{ref\_ok}$ by the two inverters shown operates to turn PMOS FET $M_{P1}$ on and NMOS FETs $M_{N1}$ and $M_{N2}$ off. With PMOS FET $M_{P1}$ on, current flows from the circuit's supply rail (here represented by the supply voltage $V_R$), through $M_{P1}$, PNP bipolar junction transistor $Q_1$, and capacitor $C_{SS}$. If the drain-source resistance of PMOS FET $M_{P1}$ is represented by resistance R, then the time varying current through $M_{P1}$ can be described in terms of the sum of relevant voltages:

$$V_R - V_{BE} - V_{SS}(t) = I(t) \cdot R. \tag{1}$$

The time varying current through capacitor $C_{SS}$ can be represented in terms of the common emitter current gain of transistor, as $I(t)/(1+\beta)$. Consequently, the voltage across $C_{SS}$ (which is the voltage $V_{SS}$) can be represented as:

$$V_{SS}(t) = \frac{I(t) \cdot \Delta t}{(1+\beta) \cdot C_{SS}}. \tag{2}$$

Substituting equation (2) into equation (1) and rearranging terms yields:

$$V_R - V_{BE} = I(t) \cdot \left[ R + \frac{\Delta t}{(1+\beta) \cdot C_{SS}} \right]. \tag{3}$$

Thus, the current through PMOS FET $M_{P1}$ and the soft-start voltage $V_{SS}$ are respectively given buy given by:

$$I(t) = \frac{V_R - V_{BE}}{R + \frac{\Delta t}{(1+\beta) \cdot C_{SS}}}, \text{ and} \tag{4}$$

$$\begin{aligned} VSS(t) &= \frac{I(t) \cdot \Delta t}{(1+\beta) \cdot C_{SS}} \\ &= \frac{V_R - V_{BE}}{(1+\beta) \cdot C_{SS}} \cdot \int_0^t \frac{1}{\frac{t}{(1+\beta) \cdot C_{SS}} + R} dt \\ &= (V_R - V_{BE}) \cdot \ln\left[\frac{t}{(1+\beta) \cdot C_{SS}} + R\right]. \end{aligned} \tag{5}$$

From equation (5), it can be seen that $V_{SS}$ linearly increases from 0 V toward a voltage specified by the values of $V_R$, $V_{BE}$, $\beta$, R, and $C_{SS}$. In practice, it is desirable to regulate $V_{SS}$ according to the reference voltage $V_{ref}$ of the device under soft-start control, and this regulation can be achieved, for example, by careful selection of the value of $C_{SS}$. Circuit operation can be further understood when considering the slope of the function $V_{SS}(t)$. As the value of $V_{SS}$ becomes greater than reference voltage $V_{ref}$, the greater the slope of the function $V_{SS}(t)$, the greater the possible overshoot in $V_{OUT}$. Similarly, if the slope of $V_{SS}(t)$ is kept smaller, then the $V_{OUT}$ overshoot will be smaller. Consequently, in many embodiments, circuit element values are selected such that when the voltage level of $V_{SS}$ approaches $V_{ref}$, the slope of the $V_{SS}(t)$ curve becomes small. This helps to reduce the soft-start time in part because overshoot is kept very low. With low overshoot and shorter soft-start times, $V_{OUT}$ can settle down quickly with minimum inrush current.

During the soft-start operation period, $V_{SS}$ forces the feedback signal $V_{fb}$ to follow it through the control of the error amplifier 125. Moreover, the output voltage of the converter $V_{OUT}$ is clearly controlled by $V_{SS}$ during soft-start operation to increase gradually. In some embodiments, soft-start circuits such as those illustrated in FIG. 2 can be optimized to completely (or nearly completely) remove overshoot in $V_{OUT}$.

Figure 3:
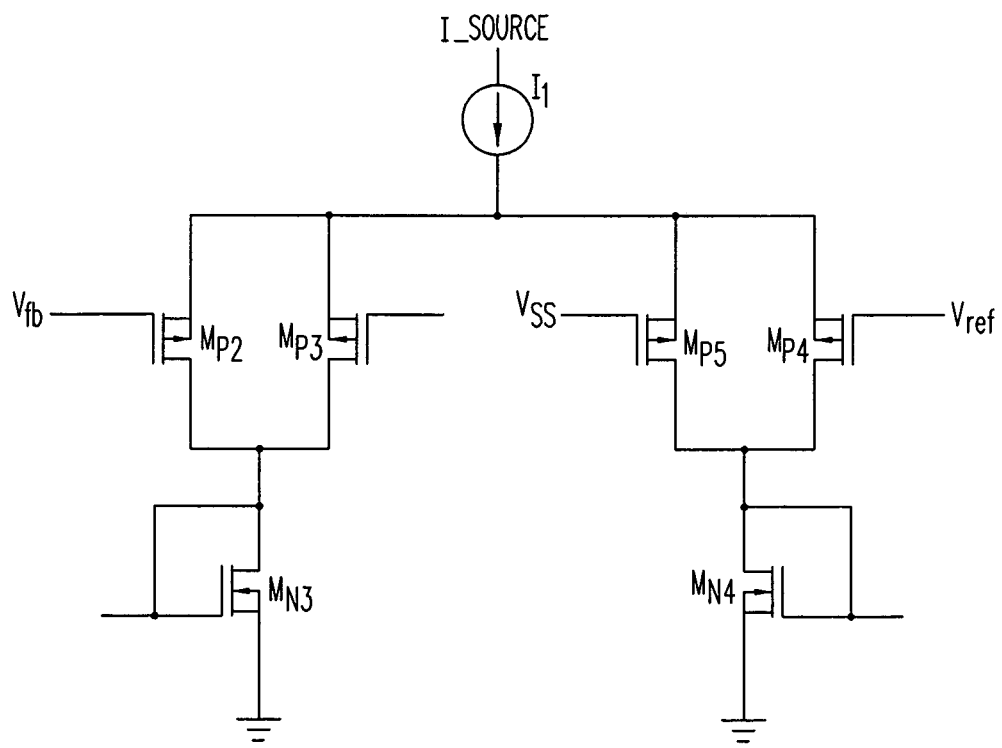
FIG. 3 is a schematic diagram of an error amplifier for use in conjunction with the soft-start circuit of FIG. 2.

To provide the proper relationship between $V_{ref}$ and the soft-start signal $V_{SS}$, specialized error amplifier designs can be employed. FIG. 3 is a schematic diagram of the input pairs of an error amplifier for use in conjunction with the soft-start circuit of FIG. 2. The error amplifier of FIG. 3 is a transconductance amplifier using a differential amplifying stage formed from PMOS transistor input pairs $M_{P2}$, $M_{P4}$ and $M_{P3}$, $M_{P5}$. The two input signals $V_{ref}$ and $V_{SS}$ represent the "positive" input signals of error amplifier 125, while the signal $V_{fb}$ represents the "negative" input signal of error amplifier 125. These input signals drive gates of respective transistors in each of the two differential input pairs, thereby processing the input signals. Although FIG. 3 is shown as including PMOS transistor $M_{P3}$, in most embodiments it is not used, and in some embodiments it is not included in the circuit.

The positive inputs have two parallel input terminals connected to $V_{ref}$ and $V_{SS}$, respectively. The negative input has one input terminal. The input (gate) of transistor $M_{P2}$ is coupled to receive feedback signal $V_{fb}$ from the feedback node. No specific input signal is required to be paired with $V_{fb}$. When $V_{SS}$ is less than reference voltage $V_{ref}$, operation of transistor $M_{P5}$ dominates the positive input stage and $V_{ref}$ contributes little to the output control signal from the amplifier. Thus, error amplifier output is largely determined by the $V_{SS}$ and feedback voltage $V_{fb}$ at the positive and negative inputs, respectively. This generally corresponds to the soft-start period of operation. When $V_{SS}$ is greater than $V_{ref}$, operation of transistor $M_{P4}$ dominates the positive input stage and $V_{SS}$ contributes little to the output control signal from the amplifier. Thus, error amplifier output is largely determined by the $V_{ref}$ and $V_{fb}$ signals at the positive and negative inputs, respectively. This generally corresponds to steady-state operation of the regulator.

As illustrated in FIG. 3, the topology of the differential transconductance amplifier uses well known differential input. However, numerous different error amplifier topologies can be implemented as will be known to those skilled in the art.

Figure 4:
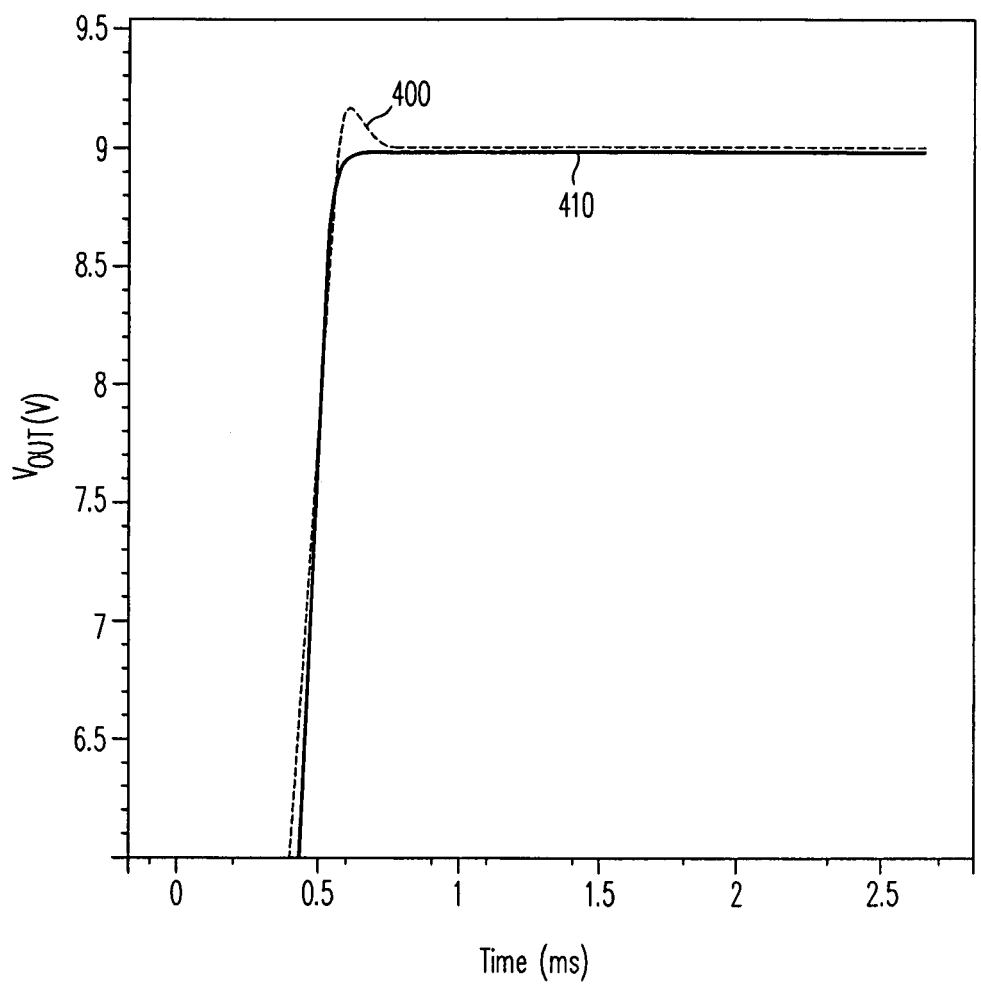
FIG. 4 illustrates simulated output voltage versus time graphs for two DC/DC converters having the same PWM control circuit, one with a conventional external soft-start circuit, and one with a soft-start circuit according to the present application.

FIG. 4 illustrates simulated output voltage versus time graphs for two DC/DC converters, one with a conventional external soft-start circuit, and one with a soft-start circuit according to the present application. In the case of so-called conventional soft-start circuits, an external capacitor is used to generate a soft-start ramp time of approximately 0.6 ms. In the example illustrated, the output 400 of the regulator using a conventional soft-start circuit overshoots the target output voltage of 9 V by approximately 100-200 mV. Moreover, the duration of the soft-start period is at least 0.6 ms. In contrast, regulator output voltage 410 illustrates the simulated output of the same type of regulator using the above-described soft-start circuit techniques. Here, overshoot is essentially eliminated, and the length of the soft-start period of operation is reduces by at least 10%.

Figure 5:
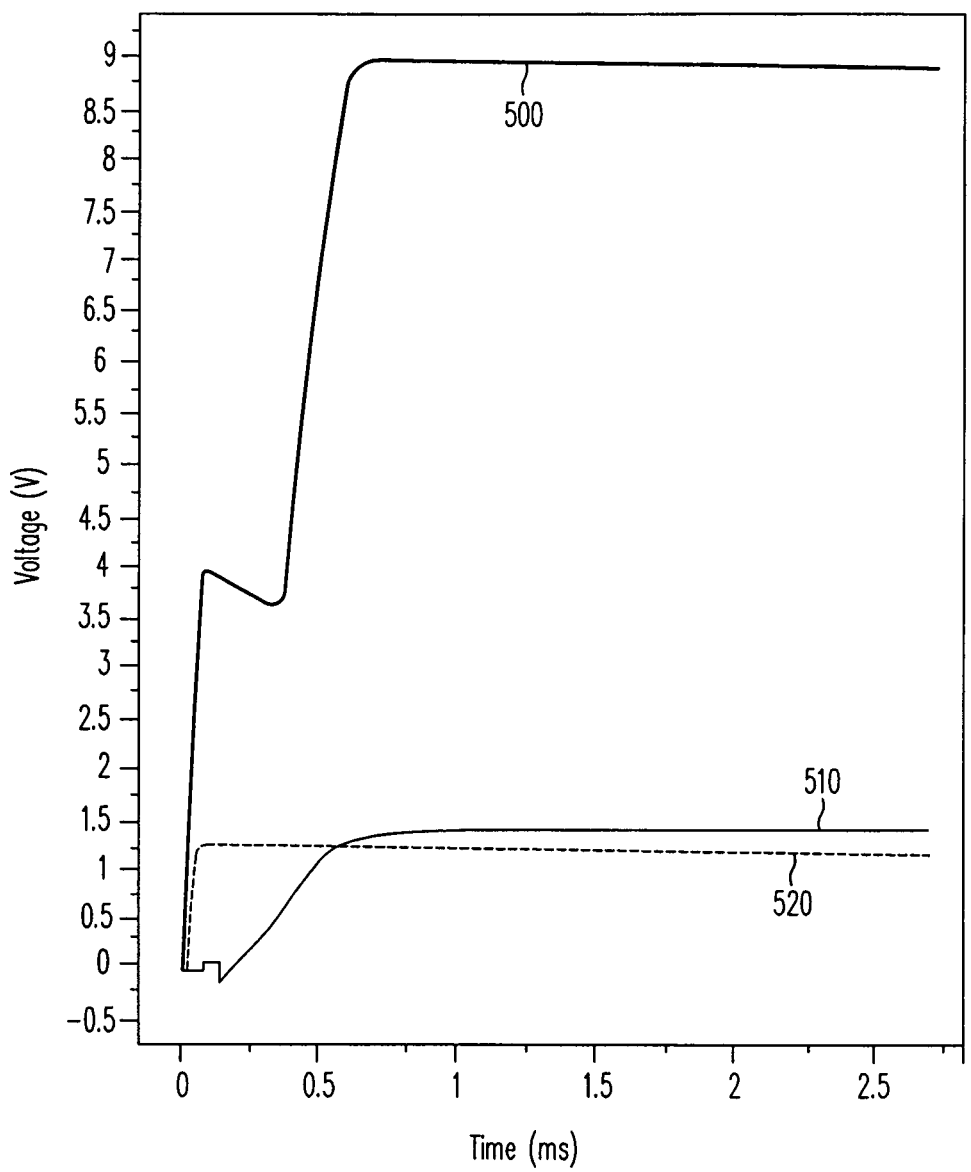
FIG. 5 further illustrates a simulated output voltage versus time graph for a DC/DC converter using the soft-start circuit according to the present application, along with graphs representing soft-start and reference signals.

FIG. 5 further illustrates a simulated output voltage versus time graph for a DC/DC converter using the soft-start circuit according to the present application, along with graphs representing soft-start and reference signals. Thus, output voltage 500 represents regulator output (e.g., $V_{OUT}$) from start-up, through the soft-start period, and to steady-state operation. Voltage trace 520 represents reference voltage $V_{ref}$, also from the period of initial power-up through steady state operation. Voltage 510 illustrates soft-start signal $V_{SS}$ which remains at zero until $V_{ref}$ has achieved steady-state, e.g., the soft-start circuit is not activated until the voltage reference is stable and the soft-start circuit receives an asserted $V_{ref\_ok}$ signal. $V_{SS}$ gradually increases during the soft-start period as described above, and levels off at a voltage typically slightly larger than $V_{ref}$. Also as indicated above, control of the feedback loop is based on $V_{fb}$ and $V_{ref}$ at this point in the device's operation.

Numerous variations and modifications to the circuits described in FIGS. 1-5 will be known to those having ordinary skill in the art. For example, many of the resistors and capacitors illustrated can be implemented using a variety of programmable and/or trimmable devices. Similarly, the disclosed devices and techniques are not necessarily limited by any transistor, inductor, resistor, or capacitor sizes, capacities, values, or by voltage levels disclosed herein. Moreover, implementation of the disclosed devices and techniques is not limited by CMOS technology, and thus implementations can utilize NMOS, PMOS, and various bipolar or other semiconductor fabrication technologies. While the disclosed devices and techniques have been described in light of the embodiments discussed above, one skilled in the art will also recognize that certain substitutions may be easily made in the circuits without departing from the teachings of this disclosure. For example, a variety of logic gate structures may be substituted for those shown, and still preserve the operation of the circuit, in accordance with DeMorgan's law. Also, many circuits using NMOS transistors may be implemented using PMOS transistors instead, as is well known in the art, provided the logic polarity and power supply potentials are reversed. In this vein, the transistor conductivity type (i.e., N-channel or P-channel) within a CMOS circuit may be frequently reversed while still preserving similar or analogous operation. Moreover, other combinations of output stages are possible to achieve similar functionality.

Regarding terminology used herein, it will be appreciated by one skilled in the art that any of several expressions may be equally well used when describing the operation of a circuit including the various signals and nodes within the circuit. Any kind of signal, whether a logic signal or a more general analog signal, takes the physical form of a voltage level (or for some circuit technologies, a current level) of a node within the circuit. Such shorthand phrases for describing circuit operation used herein are more efficient to communicate details of circuit operation, particularly because the schematic diagrams in the figures clearly associate various signal names with the corresponding circuit blocks and node names.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. A circuit for converting or amplifying power, comprising:
   a controlled circuit including a power converter;
   an error amplifier coupled to the controlled circuit and configured to provide an error amplifier signal to the controlled circuit, the error amplifier comprising:
   a first positive input terminal;
   a second positive input terminal coupled to the first positive input terminal; and
   a negative input terminal to receive a feedback signal related to an output of the power converter in the controlled circuit; and
   a soft-start circuit coupled to the error amplifier, and configured to provide a soft-start signal to at least one of the first positive input terminal and the second positive input terminal, wherein a difference between the soft-start signal and the feedback signal controls a switching duty cycle to limit inrush current of inductance and an overshoot voltage of the controlled circuit, and wherein the soft-start circuit includes a capacitor and a current divider having a bipolar transistor configured to receive a supply current and to provide at the base of the bipolar transistor a specific fraction of the received supply current according to the common emitter current gain of the bipolar transistor to charge the capacitor with the specific fraction of the supply current to provide the soft-start signal;
   wherein the controlled circuit, the error amplifier, and the soft-start circuit are each included in a same integrated circuit.

2. The circuit of claim 1 wherein the soft-start signal is provided to the first positive input terminal, and a reference signal is provided to the second positive input terminal.

3. The circuit of claim 1 wherein a feedback node coupled to an output of the controlled circuit is also coupled to the negative input terminal to provide the feedback signal.

4. The circuit of claim 3 wherein the feedback node is coupled to the output of the controlled circuit through a voltage divider.

5. The circuit of claim 1 wherein the error amplifier is a differential transconductance amplifier.

6. The circuit of claim 1 wherein the controlled circuit comprises one or more of an amplifier circuit, a comparator circuit, or a power regulator circuit.

7. The circuit of claim 1 wherein the controlled circuit comprises a DC/DC voltage converter further comprising one of a buck converter, a boost converter, a buck-boost regulator, a flyback regulator, and a push-pull regulator.

8. The circuit of claim 1 wherein the controlled circuit further comprises:
   a comparator;
   a power MOSFET; and
   a driver coupled between the comparator and the power MOSFET.

9. The circuit of claim 1 further comprising:
   a voltage reference circuit coupled to the error amplifier and configured to provide a reference signal to the error amplifier.

10. The circuit of claim 1 wherein the soft-start circuit comprises:
    a PMOS transistor;
    a first NMOS transistor and a second NMOS transistor; and
    wherein the capacitor is coupled in parallel with one of the first NMOS transistor and the second NMOS transistor to control the soft-start signal.

11. The circuit of claim 10 wherein:
    the PMOS transistor is configured to receive a reference signal and conduct current to the bipolar transistor when the reference signal is in a first state; and
    the first NMOS transistor and the second NMOS transistor are configured to receive the reference signal and to turn off to release from reset when the reference signal is in the first state.

12. A method for converting or amplifying power, comprising:
    generating a reference voltage signal;
    activating a soft-start circuit including a capacitor to produce a soft-start voltage and a bipolar transistor configured to receive a supply current and to provide at the base of the bipolar transistor a specific fraction of the received supply current according to the common emitter current gain of the bipolar transistor to charge the capacitor with the specific fraction of the supply current;
    sensing a feedback voltage associated with a voltage divider;
    providing the reference voltage, the soft-start voltage, and the feedback voltage to a differential error amplifier; and
    controlling one or more of an amplifier circuit or a voltage regulator circuit according to an output of the differential error amplifier.

13. The method of claim 12 comprising:
    generating a reference status signal; and
    transmitting the reference status signal to the soft-start circuit.

14. The method of claim 12 wherein the controlling further comprises controlling one or more of a pulse width modulator (PWM) circuit, a comparator, a driver circuit, or a power MOSFET according to an output of the differential error amplifier.

15. The method of claim 12 wherein the controlling further comprises selectively activating a power MOSFET according to the output of the differential error amplifier.

16. The method of claim 12 wherein the controlling is selectively dominated by the soft-start voltage and the reference voltage.

17. The method of claim 16 wherein the controlling is dominated by the soft-start voltage when the soft-start voltage is less than the reference voltage, and wherein the controlling is dominated by the reference voltage when the soft-start voltage is greater than the reference voltage.

* * * * *